(12) United States Patent
Scherson et al.

(10) Patent No.: US 9,994,964 B2
(45) Date of Patent: Jun. 12, 2018

(54) SYSTEM AND METHOD FOR REMOVAL OF METALS FROM SOLUTION

(71) Applicant: CASE WESTERN RESERVE UNIVERSITY, Cleveland, OH (US)

(72) Inventors: Daniel Scherson, Beachwood, OH (US); Anna Cristina Samia, Beachwood, OH (US); Zhange Feng, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 283 days.

(21) Appl. No.: 14/776,812

(22) PCT Filed: Mar. 17, 2014

(86) PCT No.: PCT/US2014/030250
§ 371 (c)(1),
(2) Date: Sep. 15, 2015

(87) PCT Pub. No.: WO2014/145477
PCT Pub. Date: Sep. 18, 2014

(65) Prior Publication Data
US 2016/0032474 A1    Feb. 4, 2016

Related U.S. Application Data

(60) Provisional application No. 61/792,821, filed on Mar. 15, 2013.

(51) Int. Cl.
*C25C 7/06*    (2006.01)
*B03C 1/01*    (2006.01)
(Continued)

(52) U.S. Cl.
CPC .............. *C25C 7/06* (2013.01); *B03C 1/01* (2013.01); *B03C 1/288* (2013.01); *B03C 1/30* (2013.01);
(Continued)

(58) Field of Classification Search
CPC ............. C25C 7/06; B03C 1/01; C02F 1/48
See application file for complete search history.

(56) References Cited

U.S. PATENT DOCUMENTS 3,984,295 A    10/1976    Kametani et al.
4,725,339 A    2/1988    Bindra et al.
(Continued)

FOREIGN PATENT DOCUMENTS

| BR | PI1105235 | 10/2013 |
| CN | 1947848 | 4/2007 |
| WO | 0106235 A1 | 1/2001 |

OTHER PUBLICATIONS

Extended European Search Report for application EP14762461.3, PCT/US2014030250, dated Jul. 21, 2016, European Patent Office, Germany.
(Continued)

*Primary Examiner* — Bryan D. Ripa
(74) *Attorney, Agent, or Firm* — McDonald Hopkins LLC

(57) ABSTRACT

A process to extract metal ions and potentially other hazardous species present in solution to levels low enough to make it suitable for use and/or to quantify the levels of these contaminants in the solution. The process involves the use of functionalized magnetic particles to bind with metal ions. The process occurs in a three-chambered cell and utilizes a magnet to agglomerate the magnetic particles bound with metal ions to an electrode, and by altering the pH of the solution within the cell using gases produced by a solid state electrolyzer or from the air, encourages the plating of the
(Continued)

metal ions on the electrode and the pushing out of the metal-free solution out of the cell.

7 Claims, 5 Drawing Sheets

(51) Int. Cl.
  *C02F 1/48* (2006.01)
  *B03C 1/28* (2006.01)
  *B03C 1/30* (2006.01)
  *C25C 1/00* (2006.01)
  *C25C 7/02* (2006.01)
  *C02F 1/461* (2006.01)
  *C02F 1/66* (2006.01)

(52) U.S. Cl.
  CPC ......... *C02F 1/46104* (2013.01); *C02F 1/481* (2013.01); *C02F 1/66* (2013.01); *C25C 1/00* (2013.01); *C25C 7/02* (2013.01); *B03C 2201/18* (2013.01); *C02F 2001/46133* (2013.01); *C02F 2001/46142* (2013.01); *C02F 2201/46195* (2013.01)

(56) References Cited

U.S. PATENT DOCUMENTS

| | | | |
|---|---|---|---|
| 5,541,072 A * | 7/1996 | Wang | B03C 1/01 209/214 |
| 6,077,416 A | 6/2000 | Khalemsky et al. | |
| 6,350,520 B1 | 2/2002 | Nesbitt et al. | |
| 6,511,645 B1 | 1/2003 | Nesbitt et al. | |
| 6,596,182 B1 * | 7/2003 | Prenger | B01J 20/28009 210/222 |
| 6,673,321 B2 | 1/2004 | Weakly et al. | |
| 6,887,368 B2 | 5/2005 | Khalemsky et al. | |
| 7,153,435 B2 | 12/2006 | Prenger et al. | |
| 7,267,777 B2 * | 9/2007 | Koren | C02F 1/5245 210/695 |
| 7,520,994 B2 | 4/2009 | Dong et al. | |
| 7,754,099 B2 | 7/2010 | Hayashi et al. | |
| 7,799,232 B2 | 9/2010 | Hayashi et al. | |
| 7,892,426 B2 | 2/2011 | Hayashi et al. | |
| 8,679,458 B2 * | 3/2014 | Yantasee | G01N 33/54326 205/792 |
| 2003/0070940 A1 | 4/2003 | Hirayama et al. | |
| 2010/0116747 A1 * | 5/2010 | Franzreb | B01D 11/0419 210/663 |
| 2010/0252445 A1 | 10/2010 | Highgate et al. | |
| 2011/0120879 A1 | 5/2011 | Buschmann | |
| 2012/0018382 A1 | 1/2012 | Stein | |

OTHER PUBLICATIONS

CN Notification of the First Office Action for application CN201480026643.1, dated Oct. 19, 2016, State Intellectual Property Office of People's Republic of China, China.
Condomitte, U., et al., "Magnetic nanohydrometallurgy: A promising nanotechnological approach for metal production and recovery using functionalized superparamagnetic nanoparticles", Hydrometallurgy, Jun. 7, 2012, vol. 125, pp. 148-151, Elsevier Scientific Publishing CY., Amsterdam, NL.
Zhenming, Li, "Study on Application of Functionalized Magnetic Carrier in Water Treatment", Chinese Master's Theses Full-text Database, Engineering Science and Technology I, 2007, No. 6.
ISA/US, International Search Report and Written Opinion prepared for PCT/US2014/030250 dated Aug. 8, 2014.
Feng et al., "Adsorption of Cd2+ on Carboxyl-Terminated Superparamagnetic Iron Oxide Nanoparticles," Anal. Chem., Mar. 18, 1012, 3764-3770.
Hai et al., "Metal-Iron Adsorption on Carboxyl-Bearing Self-Assembled Monolayers Covalently Bound to Magnetic Nanoparticles," Am. Chem. Soc., Langmuir 2005, 3104-3105.
Khalemsky et al, "New Technology for Tannery Wastewater Treatment," Industrial Wastewater and Best Available Treatment Technologies Conference (Nashville, TN, Feb. 26, 2003).
Brown University, "Novel device removes heavy metals from water," News from Brown Dec. 16, 2011, https://news.brown/edu/articles/2011/12/cep.

* cited by examiner

SYSTEM AND METHOD FOR REMOVAL OF METALS FROM SOLUTION

CROSS REFERENCE TO RELATED APPLICATIONS

The present application claims priority to and the benefit of the filing date of U.S. Provisional Application No. 61/792,821 filed on Mar. 15, 2013, and PCT Application No. PCT/US2014/030250, filed on Mar. 17, 2014, entitled "System and Method For Removal of Metals From Solution," each of which is incorporated herein by reference in its entirety.

FIELD OF INVENTION

The present invention relates to the capture of metals including metal contaminants, e.g., heavy metals, and potentially other hazardous species present in a solution, More specifically, the present invention relates to a system and method employing magnetic particles functionalized with chemical groups capable of reversibly binding metal ions.

BACKGROUND OF THE INVENTION

Water contamination is a serious problem in the United States and throughout the world. In the last several decades water pollution has been the subject of increased government scrutiny and regulation. In response to the need for clean drinking water and the need to maintain clean water in rivers, lakes, oceans, and wet lands, detailed statutory and regulatory schemes have been developed at the state and local levels in the United States. These statutory and regulatory schemes relate to many types of activities that can produce water pollution. Such activities include everything from controlling and monitoring the quality of run-off from farming operations and in storm drainage systems, to the regulation of industrial, mining, and commercial activities such as oil and gas exploration. Almost any activity that produces or has the capability of producing significant quantities of tainted water will likely be regulated by state and federal regulations. Several regulatory agencies deal extensively with the regulation of water emissions. Some of these agencies include the United States Environmental Protection Agency (EPA), which has broad regulatory authority; the United States Coast Guard, which regulates the use of navigable waters; state Oil and Gas Boards, which regulate produced waters at well sites; and state and federal agencies dealing with mine regulation.

Various water contaminants, and specific activities that have the capability of producing water contamination, are the subject of water quality regulations. Materials that may be regulated range from pesticides and fertilizers to petrochemical-related hydrocarbons and numerous chemicals and hazardous materials. Any materials that may arguably be detrimental if placed in the water supplies of the nation are subject to regulation and controlled emission.

Heavy metals are one class of water contaminant that is encountered widely in the environment. Essentially all transition metals can exist as dissolved ions in water. Examples of heavy metals that may become water contaminants include lead, manganese, cobalt, cadmium, and others. These materials present significant water contamination problems when they exist in a stream or water supply. Consuming water that contains heavy metals can be detrimental to the health of humans and animals alike. Heavy metal poisoning can be a serious public health issue. Accordingly, there is significant interest in extracting heavy metals from water supplies.

At the same time, removal of heavy metals from water in bulk is a difficult and expensive process. While the chemistry of heavy metals is well understood, applying that chemistry to remove heavy metals from water in the environment and at ambient conditions has proven difficult and expensive. These processes often require large bulky processing facilities and can produce waste products that are themselves hazardous and pose difficult disposal issues.

Adding to the problem is that fact that some old industrial and mining operations have produced heavy metal emissions over many decades and in some cases for more than a century. Many of these operations pre-date modern water contamination control regulation and the development of modern water contamination control technology. Thus, these operations produced heavy metal emissions with not much effort directed to removal of the metals from the water or limitation of the contaminants prior to their release into the environment.

Where these types of facilities have continued in operation, they have been brought up to standards by the application of the necessary modifications as required by the regulatory schemes mentioned above. However, in cases where mines and other industrial facilities closed down prior to the implementation of contamination control systems and technology and the implementation of modem regulatory schemes, it is quite possible for such facilities to continue to produce water emissions tainted by heavy metals.

This is particularly true of mining operations where ground water flows through the mine and exits into local streams and drinking water. Heavy metal contamination of natural water sources continues to be a problem in the mining communities long after mining has ceased. Due to the undesirability of heavy metal contamination in the water, much effort and expense is necessary to remediate these problems, often with less than adequate results.

Many problems exist with traditional heavy metal or water treatment remediation methods. One such method is metal hydroxide precipitation to remove heavy metals. This method, and many other conventional methods, adds large quantities of chemicals to the waste stream that might contain quantities of contaminants at levels less than parts per thousand. These types of procedures can result in large quantities of metal-contaminated or metal-containing precipitate. As mentioned above, the disposal of the resultant metal-laden precipitate presents disposal problems of its own, particularly if the precipitate has the potential to later leach metals back into the environment.

Most conventional processes for water remediation require complex and bulky equipment. These processes are expensive and sometimes result in less than adequate cleaning of the water. Conventional processes often result in a waste material that itself is hazardous and must be disposed of using expensive techniques that may be the subject of further regulations.

Further, the ability to extract contaminants from water creates the potential of both sensing and monitoring the levels of those contaminants in a given water sample.

Thus, there is a need to provide improved methods and apparatus for extracting contaminants from water. More particularly, there is a need to provide methods and systems that are capable of quantifying and/or extracting metal contaminants, e.g., heavy metals, from water.

SUMMARY OF THE INVENTION

The present invention provides a system and method to extract metals, e.g., metal contaminants, from a solution.

The invention provides a method for extracting metals or contaminants without the need for introducing large quantities of chemicals into the solution to be treated. For example, the present invention can also provide a system and method that may not require larger equipment or facilities required with conventional water treatment facilities. The invention employs a material that is reusable and allows for reduced costs in conducting the water treatment operation.

In one aspect, the present invention provides a process for extracting a metal species from a solution, said process comprising: (a) providing a solution to an electrochemical cell comprising a cathode, the solution comprising a metal ion to be removed from the solution; (b) introducing a plurality of functionalized magnetic particles into the solution, the functionalized magnetic particles comprising a functional group suitable for binding the metal ion; (c) adjusting the pH of the solution by oxidizing hydrogen or reducing oxygen produced by a solid state polymeric electrolyzer or from the air to promote binding of the metal ion to the functionalized magnetic particles; (d) magnetically drawing the particles to the cathode; and (e) applying an electrical current to the cell and plating the metal ions onto the cathode.

In one embodiment, the method comprises repeating operations (b) through (e) until a threshold concentration of the metal is obtained.

In one embodiment, a magnetic force is applied to the cathode prior to providing the solution to the electrochemical cell such that the functionalized magnetic particles are associated with the cathode.

In one embodiment, introducing the functionalized particles into the solution comprises removing the magnetic force from the cathode such that the functionalized magnetic particles are dispersed in the solution.

In one embodiment, the method comprises removing the solution from the electrochemical cell after the concentration of metal in the solution reaches a threshold level, and introducing another contaminated solution to the electrochemical cell.

In one embodiment, the method comprises adjusting the pH of the solution to be acidic to promote the release of the metal ions from the functionalized magnetic particles.

In one embodiment, the functionalized particles are selected from the group: iron oxide particle functionalized with a species bearing a —SH terminal group, iron oxide particle functionalized with a species bearing a —COOH terminal group, iron oxide particle functionalized with a species bearing a —$NH_2$ terminal group, or a combination of two or more thereof.

In one embodiment, the cathode is a carbon plate.

In one embodiment, the solution is chosen from an aqueous or non-aqueous solution.

In one embodiment, the solution comprises water.

In one embodiment, the solution is a salt solution.

In another aspect, the present invention provides a solution treatment apparatus for treating a solution containing a metal material, the apparatus comprising: a cell comprising a first chamber and a second chamber, the first chamber comprising: a first electrode on a first end of the first chamber; a second electrode on a second end of the first chamber, the second end of the chamber being opposite the first end of the first chamber; a potentiostat connecting the first electrode to the second electrode; and an electrolyte solution comprising a solution comprising a metal contaminant, and further comprising functionalized particles comprising a functional group suitable for binding the metal; a second chamber abutting the first chamber on the second end of the first chamber, the second chamber containing a solid state polymer electrolyzer located on a side of the second chamber distant from the first chamber; and a pure gas or gas mixture; a third chamber containing water and water vapor; and a magnet removably associated with the first electrode of the first chamber.

In one embodiment, the second electrode is porous carbon with platinum/iridium, 4.6 mg/$cm^2$.

In one embodiment, the second chamber contains a gas chosen from the group consisting of: nitrogen, oxygen, hydrogen, or a combination or two or more thereof.

In one embodiment, the solution is chosen from an aqueous or non-aqueous solution.

In one embodiment, the solution comprises water.

In one embodiment, the solution is a salt solution.

In one embodiment, the electrolyzer is of the solid state type comprising a polymer electrolyte membrane.

In still another aspect, the present invention provides a process for extracting a metal from solution, said process comprising: (a) providing a solution to a system comprising an electrochemical cell comprising a cathode, and a magnet removably associated with the electrochemical cell, the cell comprising a plurality of functionalized magnetic particles, and the solution comprising a metal ion to be removed from the solution; (b) removing the magnet from the system such that the functionalized magnetic particles disperse into the solution; (c) adjusting the pH of the solution by oxidizing hydrogen or reducing oxygen produced by the electrolyzer or from the air to promote binding of the metal ion to the functionalized magnetic particles; (d) associating the magnet with the cathode to drive the particles to the cathode; and (e) applying an electrical current to the cell and plating the metal ions onto the cathode. In one embodiment, the solution is chosen from an aqueous or non-aqueous solution.

In one embodiment, the solution comprises water.

In one embodiment, the solution is a salt solution.

BRIEF DESCRIPTION OF THE DRAWINGS

Aspects and embodiments of the invention may be better understood with reference to the detailed description taken in connection with the following Figures, wherein.

DETAILED DESCRIPTION

Figure 1:
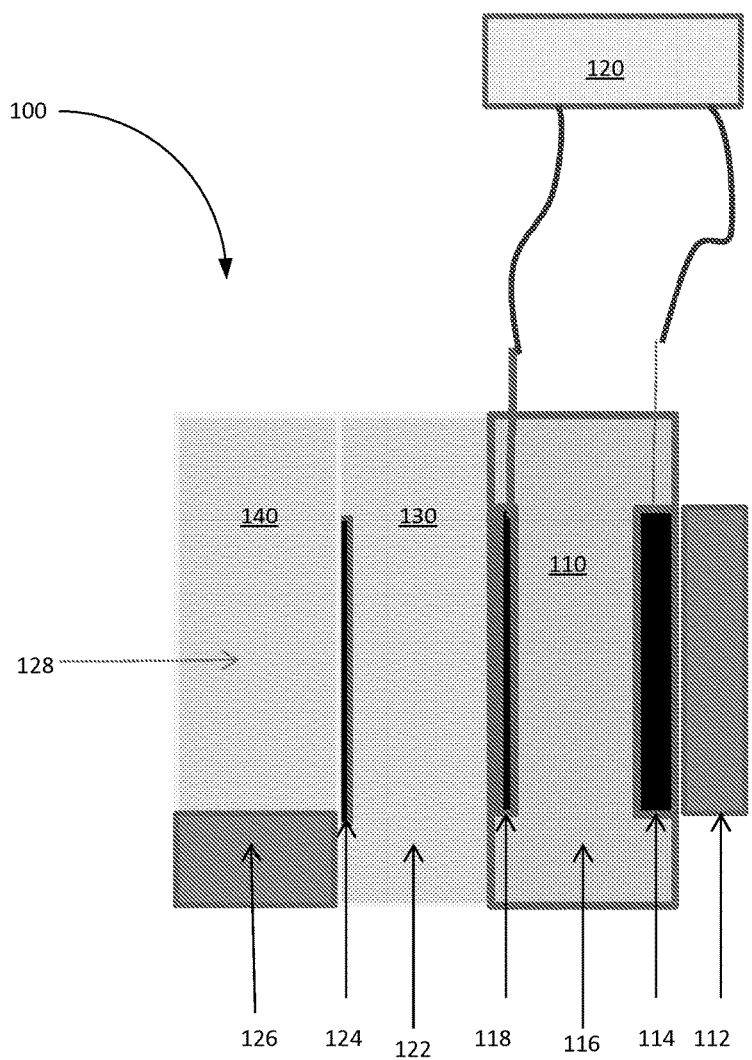
FIG. 1 is a schematic illustration of a system for extracting metal contaminants from a solution in accordance with an embodiment of the invention.

Aspects of the present invention will now be described with reference to various exemplary embodiments, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Any elements described herein as singular can be pluralized (i.e., anything described as "one" can be more than one). Any species element of a genus element can have the characteristics or elements of any other species element of that genus. The described configurations, elements or complete assemblies and methods and their elements for carrying out the invention, and variations of aspects of the invention can be combined and modified with each other in any combination.

Although various embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

The present invention provides a method to remove metals from a solution through the use of a solution remediation system. The method can be used to remove any metal of interest from a solution. For example, the method can be used to remove metal contaminants from a solution. As used herein, the term "contaminant" may refer to a material that is undesirable to have present at all or at a particular concentration in a particular solution or fluid system of interest. Contaminants can include various metals, ionic species, and neutral species thereof. The metal contaminants may be, but are not limited to, particles, including atoms, molecules, or compounds that make a solution no longer suitable for use, e.g., by dirtying, damaging, or polluting a solution. The invention provides a method for extracting metals without the need for introducing large quantities of chemicals into the water to be treated. The metals to be removed from a solution using the apparatus and method do not necessarily have to be contaminants but can be any metal of interest that a user may wish to extract, recover and/or collect from a solution. The system employs a material for extracting metal ions that is reusable and can be regenerated to extract metal ions in subsequent treatment operations.

Generally, the present technology provides a system and method for extracting metals from a solution. The system and method comprise employing particles that are capable of reversibly binding and complexing metal ions and being transported to a location to plate the metal as a way to remove the metal from the solution. Functionalized magnetic particles are utilized to bind or complex the metal ions and magnetic fields are selectively applied to move the particles from one location within the system to a desired location to plate the metal.

FIG. 1 illustrates an embodiment of a solution remediation system 100 in accordance with aspects of the invention. The system 100 may also be referred to herein as a cell. The system is operated as an electrochemical cell for the removal of a metal from a sample of solution contaminated with metals such as, e.g., heavy metal ions. The cell 100 comprises three chambers 110, 130, and 140, and an external magnet 112, which can be removably associated with the cell 100. The first chamber 110 comprises a first electrode 114. The first electrode 114 may be a flat carbon electrode with a concentrated dispersion of functionalized magnetic particles placed upon it. The first electrode 114 may be a cathode. The magnet 112 is removably associated with the first chamber 110. In one mode, the magnet 112 is associated externally with the first chamber 110 in proximity to the electrode 114 such that the functionalized magnetic particles are drawn or magnetically driven to and aggregate about the surface of the cathode (electrode 114).

The functionalized magnetic particles comprise chemical groups bonded to the particle and include a functional group capable of reversibly binding metal ions. For example, the functionalized magnetic particles may be an iron oxide particle functionalized with a species bearing terminal groups, such as, but not limited to, —SH, —COOH, and —NH$_2$ groups, which display high affinity for ions of interest, such as, but not limited to, Hg$^{2+}$, Pb$^{2+}$, Cd$^{2+}$, etc. The chemical group can be a surfactant or other molecule of a suitable chain length. The ability to coordinate various heavy metal ions in a solution with functionalized magnetic particles is described in *Adsorption of Cd$^{2+}$ on Carboxyl-Terminated Superparamagnetic Iron Oxide Nanoparticles*, Zhange Feng et al., 84 Anal. Chem., 3764 (2012), the disclosure of which is incorporated herein by reference in its entirety.

The functionalized magnetic particles are not limited to iron oxide particles and can be chosen from any other suitable magnetic particles. The size of the magnetic particles is not particularly limited and can be chosen as desired for a particular purpose or intended application. In one embodiment, the magnetic particles may be provided as nano-scale particles having a particle size of less than 1 micron. Additionally, the functionalized magnetic particles may range in size from about 1 to about 500 nm, about 5 to about 250 nm, about 10 to about 150 nm, about 20 to about 100 nm, and even about 25 to about 50 nm. Further, the functionalized magnetic particles may range in surface area from about 20 to about 200 m$^2$/g, about 40 to about 150 m$^2$/g, even about 50 to about 100 m$^2$/g. Here as elsewhere in the specification and claims, numerical values can be combined to form new and non-disclosed ranges.

Additionally, the magnetic particles can be functionalized with any suitable functional group for complexing a metal ion or metal complex of interest. Thus, the functional species is not limited to —SH, —COOH, —NH$_2$, etc. It may be desirable to employ a functional group that has a relatively high affinity for several metals. Mixtures of magnetic particles with different functional groups on a single particle or between different particles can also be used for treating a solution having different contaminants that are not complexed by the same type of functional group.

It will also be appreciated that the system and method can be used to remove a variety of metals or other ionic species from a solution, including, but not limited to, mercury, lead, cadmium, barium, strontium, vanadium, nickel, chromium, selenium, calcium, zinc, etc.

The external magnet 112 is utilized to magnetically drive functionalized magnetic particles toward and subsequently immobilize the functionalized magnetic particles on or near the surface of the first electrode 114. The first electrode 114 is connected to a potentiostat 120, which is located outside of the first chamber 110. The potentiostat 120 is also connected to a second electrode 118. The second electrode 118 is located within the first chamber 110, on the opposite side of the first chamber 110 from the first electrode 114. The second electrode 118 may be, for example, porous carbon with Platinum/Iridium, 4.6 mg/cm$^2$. The first chamber 110 is filled with an electrolyte solution 116. The electrolyte solution 116 may be, but is not limited to, 0.1 M $NaClO_4$.

Adjacent to the first chamber 110 of the unit 100 is a second chamber 130. The second chamber 130 is located adjacent to the side of the first chamber 110 opposite from the magnet 112. The second chamber 130 is a gas chamber. The second chamber 130 contains a pure gas or a gas mixture 122. The gaseous mixture 122 may contain any appropriate gas, e.g., nitrogen, oxygen, or hydrogen gas. The gas mixture 122 provided to the chamber 130 is chosen based on the pH required by the electrolyte 116 in the first chamber 110. Within the second chamber 130, on the side distant from the first chamber 110, is the electrolyzer 124. The electrolyzer 124 may be a polymer electrolyte membrane (PEM) electrolyzer. The electrolyzer 124 may produce hydrogen or oxygen, when the solution being purified is a water-based solution.

Adjacent to the second chamber 130 of the unit 100, located on the side distant from the first chamber 110, is a third chamber 140. The third chamber 140 is a water storage chamber. The third chamber 140 contains water 126 to create water vapor 128 to provide a moist environment for the electrolyzer 124.

Figure 2:
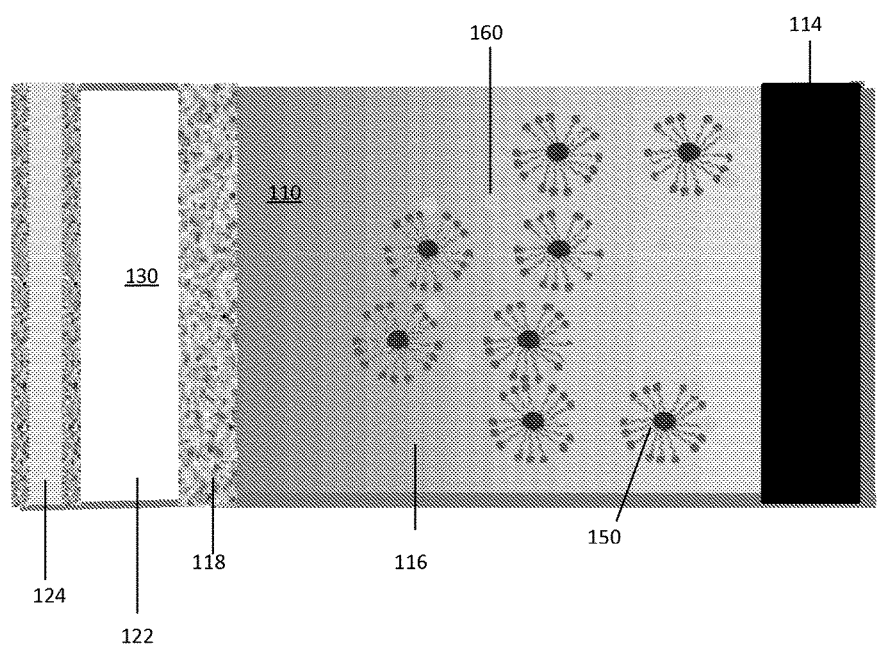
FIG. 2 is a schematic illustration of a step in a process for extracting metal contaminants containing metal ions and dispersed functionalized magnetic particles.

FIGS. 2 through 5 illustrate a method of operating system 100 in accordance with the invention to remove metal ions from solution. As shown in FIG. 2, a solution 116 containing metal ions 160 is introduced into the first chamber 110. The solution 116 can also be referred to herein as an electrolyte solution. The solution 116 may be a water-based solution, a salt solution (e.g., NaCl), or any other appropriate electrolyte solution. The external magnet 112 is removed from the cell 100 to allow full dispersion of the magnetic particles 150 into the electrolyte solution 116. In order to optimize uptake of the metal ions 160 by the functionalized magnetic particles 150, the pH of the electrolyte solution 116 is adjusted to make the solution slightly alkaline using the second electrode 118, further using an additional electrode (not shown) as counter. The second electrode 118 may be gas permeable. If the original electrolyte solution 116 is found to be too acidic, the second electrode 118 may be polarized sufficiently negative to promote reduction of dioxygen from the atmosphere or produced by the electrolyzer generating hydroxyl ions until the desired pH is achieved.

Figure 3:
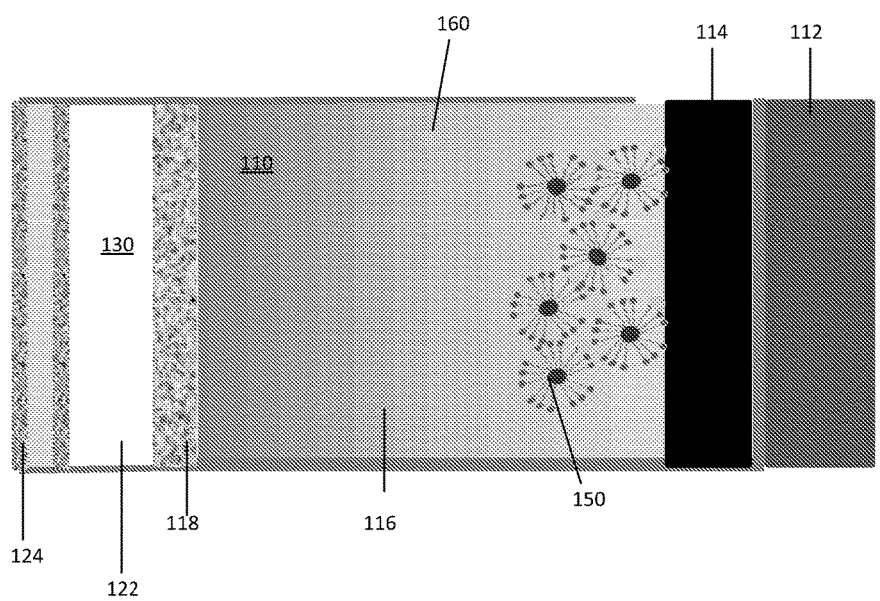
FIG. 3 is a schematic illustration of a step in a process for extracting metal contaminants in which the particles with the bound metal are driven to the cathode.

As shown in FIG. 3, after allowing a sufficient time for the uptake to proceed, the external magnet 112 is brought into position behind the first electrode 114, magnetically driving the functionalized magnetic particles 150 to aggregate on or near the surface of cathode (first electrode 114).

Figure 4:
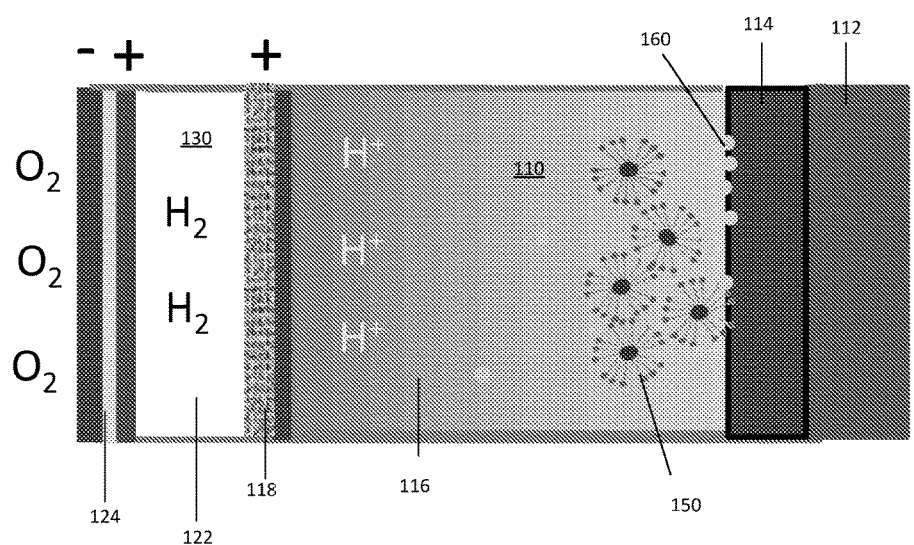
FIG. 4 is a schematic illustration of a step in a process for extracting metal contaminants in which the metal is dissociated from the particles and plated out of the system on the cathode.

As shown in FIG. 4, while the functionalized magnetic particles 150 are magnetically confined adjacent to the first electrode 114, and, in an embodiment where the solution is water, after polarizing the second electrode 118 sufficiently positive, the second chamber 130 is purged with pure nitrogen to remove oxygen, and the electrolyzer 124 is polarized so as to generate hydrogen within the second chamber 130. The hydrogen gas is then oxidized by the second electrode 118, working as an anode, releasing protons into the electrolyte solution 116, thus lowering the pH and forcing the functionalized magnetic particles 150 to release the metal ions 160, which are then plated onto the first electrode 114. The pH of the solution may be less than 7, less than 6.7, less than 6.5, less than 6, less than 5.7, or less than 5.5.

After completing the operation in FIG. 4, the system can be analyzed to determine the concentration of a selected metal remaining in the electrolyte solution 116. This can be done by a suitable wet chemical or electrical apparatus. In one embodiment, the cell 100 may include a sensor (not shown) to detect the level of free metal ions 160 remaining in the solution 116, and which have not plated on the first electrode 114. Users may evaluate the concentration of metal ions 160 in solution 116 prior to beginning the next step to determine if a threshold concentration of a selected metal has been reached. The threshold concentration may depend on the metal or metals of interest, the end use of the sample being treated, or a combination of these factors. The threshold level could be in the pph, ppm, or even ppb level.

Figure 5:
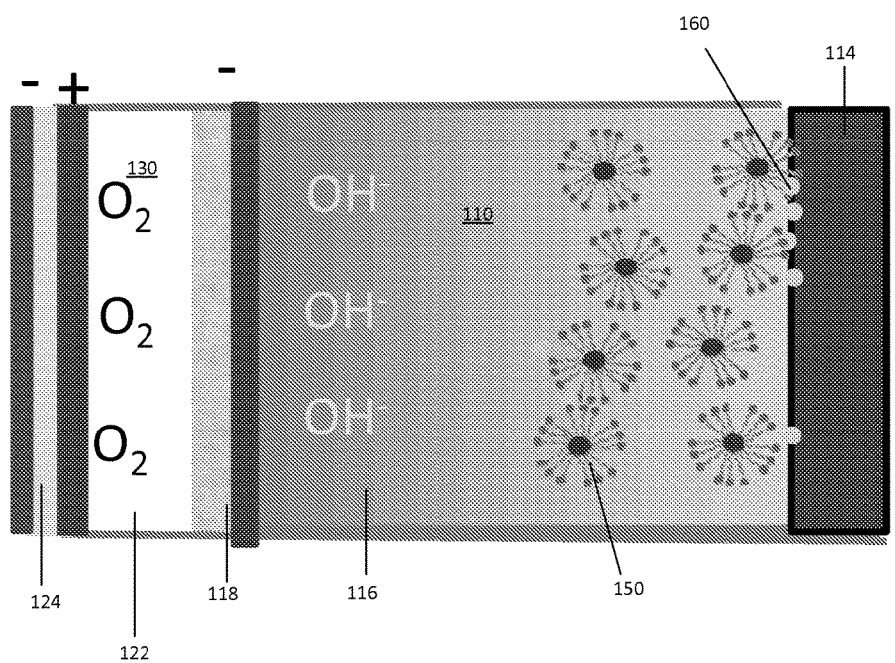
FIG. 5 is a schematic illustration of a step in a process for extracting metal contaminants in which the particles are released into the contaminated solution to remove further metal contaminants from the solution.

If the concentration of metal ions 160 in the solution 116 is too high, the external magnet 112 may be removed from the cell 100, as shown in FIG. 5. At this stage, the entire cycle may be started again. The pH of the solution 116 may be raised by polarizing the second electrode 118 negative enough to allow for capture of metal ions 160 by the functionalized magnetic particles 150, as shown in FIG. 2. The steps of the method illustrated in FIGS. 2-5 may be repeated until a desired concentration of metal ions 160 in the solution 116 is achieved.

In one embodiment, the amount of metal plated can be evaluated by scanning the potential of the electrode 114 toward positive values to strip the deposits and measuring the charge associated with the stripping peaks. Also, the potential associated with the peaks can be used to determine the type of metal plated.

After the desired threshold concentration is reached, the first electrode 114 and external magnet 112 assembly, acting as a piston, will be pushed towards the second electrode 118, forcing the metal free solution out of the cell 100 where it will be collected. After extracting the now clean solution 116, a valve system may then allow a new batch of contaminated solution to enter into the first chamber 110 of the cell 100. At this point, the method from FIGS. 2-5 may be repeated until the desired concentration of the solution is achieved.

The present method and apparatus may be used in a variety of applications and for purifying a variety of solutions. The solution is not particularly limited and can generally be any solution comprising a metal ion or metal complex species of interest. The solution can be aqueous or non-aqueous. In one embodiment the solution is a water solution. The source of the solution is not limited and can be derived from a natural source or a man-made source. The solution could be waste water or effluent from an industrial site, etc., such as an oil drilling site, chemical plant, manufacturing plant, steel plant, fracking site, etc.

In one embodiment, the method may be used to remove heavy metals from water so that the water is safe for human consumption and other uses. Additionally, the method may be used in fracking applications, e.g., to remove trace metals from water. The method may also be used to purify mining waste by extracting valuable metals from solution. The method may be used to separate metal ions from a solution containing metals that cannot be plated.

Embodiments of the invention have been described above and, obviously, modifications and alterations will occur to others upon the reading and understanding of this specification. The invention and any claims are intended to include all modifications and alterations insofar as they come within the scope of the claims or the equivalent thereof.

The invention claimed is:

1. A solution treatment apparatus for treating a solution containing a metal material, the apparatus comprising:
   a cell comprising a first chamber and a second chamber, the first chamber comprising:
      a first electrode on a first end of the first chamber;
      a second electrode on a second end of the first chamber, the second end of the chamber being opposite the first end of the first chamber;
      a potentiostat connecting the first electrode to the second electrode; and
      an electrolyte solution comprising a solution comprising a metal, and further comprising functionalized particles comprising a functional group suitable for binding the metal;
   the second chamber abutting the first chamber on the second end of the first chamber,
   the second chamber containing
      a solid state polymer electrolyzer located on a side of the second chamber distant from the first chamber; and
      a pure gas or gas mixture;
      a third chamber containing water and water vapor; and
      a magnet removably associated with the first electrode of the first chamber.

2. The solution treatment apparatus of claim 1, wherein the second electrode is porous carbon with platinum/iridium, 4.6 mg/cm$^2$.

3. The solution treatment apparatus of claim 1, wherein the second chamber contains a gas chosen from: nitrogen, oxygen, hydrogen, or a combination or two or more thereof.

4. The solution treatment apparatus of claim 1, wherein the electrolyzer is of a solid polymer type.

5. The solution treatment apparatus of claim 1, wherein the solution is chosen from an aqueous or non-aqueous solution.

6. The solution treatment apparatus of claim 1, wherein the solution comprises water.

7. The solution treatment apparatus of claim 1, wherein the solution is a salt solution.

* * * * *